United States Patent [19]

Boehringer

[11] Patent Number: 4,483,498
[45] Date of Patent: Nov. 20, 1984

[54] FLIGHT CONTROL SURFACE COUPLING SYSTEM

[75] Inventor: Wilfred E. Boehringer, Fullerton, Calif.

[73] Assignee: McDonnell Douglas Corporation, Long Beach, Calif.

[21] Appl. No.: 398,089

[22] Filed: Jul. 14, 1982

[51] Int. Cl.³ .............................................. B64C 9/02
[52] U.S. Cl. ................................. 244/75 R; 244/213; 244/38
[58] Field of Search ................. 244/75 R, 213, 214, 244/215, 203, 82, 38, 76 R; 464/160, 30, 161; 267/154

[56] References Cited

U.S. PATENT DOCUMENTS

| | | | |
|---|---|---|---|
| 2,186,558 | 1/1940 | Rouanet et al. | 244/38 |
| 2,315,110 | 3/1943 | Dornier | 244/83 |
| 2,370,844 | 3/1945 | Davis | 244/82 |
| 2,509,141 | 5/1950 | Freel | 244/1 |
| 2,584,667 | 2/1952 | Bockrath | 244/38 |
| 3,212,296 | 10/1965 | Benjamen | 464/30 |
| 3,883,093 | 5/1975 | Violleau | 244/42 D |
| 3,953,012 | 4/1976 | Robinson | 267/154 |
| 3,958,779 | 5/1976 | Townsend | 244/75 R |
| 4,213,587 | 7/1980 | Roeseler et al. | 244/213 |
| 4,305,177 | 12/1981 | Feifel | 16/162 |
| 4,345,538 | 8/1982 | Warner et al. | 244/215 |

FOREIGN PATENT DOCUMENTS 7209 of 1909 United Kingdom .................. 244/38

Primary Examiner—Galen L. Barefoot
Attorney, Agent, or Firm—Paul T. Loef; George W. Finch; Donald L. Royer

[57] ABSTRACT

A flight control surface coupling system which provides a two-element drive coupling between two control surface segments. The first element is a torsion bar that has adequate spring rate to suppress surface flutter yet soft enough to deflect and function as a low load compliance element between sets of drive actuators. The second element is a drive coupling that permits the two surface segments to move freely within its stops. The stops are spaced to allow easy determination of out-of-rig conditions and small enough to provide an effective drive to move one segment through the second segment with a single actuator. Structural fatigue loads are greatly reduced without sacrificing surface positionability.

4 Claims, 2 Drawing Figures

FLIGHT CONTROL SURFACE COUPLING SYSTEM

BACKGROUND OF THE INVENTION

This invention pertains to airfoils with control surfaces, and more particularly to means of coupling together a segmented control surface which also provides external visual indication of an actuator system failure.

Historically, in airfoil designs having a trailing control surface, e.g. rudders and elevators, it has been necessary to provide means to restrain the control surface in the event the means used to actuate the surface fails in a fashion which would allow the surface to rotate freely about its hinge-line. Some means is necessary to stabilize the failed control surface about its trail position relative to the airfoil so as to prevent surface flutter after the failure. Classically, mass was added at the proper location on the control surface so as to behave as a counterbalance, stabilizing the surface against flutter about its trail position. In a true flutter condition, the control surface is excited at its natural frequency and there is insufficient dampening to attenuate the vibration. The surface will continue to oscillate at greater amplitudes until failure occurs. Typically, this happens as a result of a complex coupling of the control surface with another structure, such as the wing. Counterbalancing the control surface with weight produces an overbalancing moment which increases as the motion of the wing or main airfoil increases and acts in the opposite direction, i.e., out of phase. Also, the overbalancing moment is directly proportional to the acceleration, which is not true if the biasing means is a spring as opposed to a mass.

Introduction of the fully powered control surface changed things somewhat. The full powered system not only provides adequate muscle to drive the control surface, but it provides a stiff locking means between the main airfoil and the control surface so that they act as a single unit which prevents the control surface from fluttering. However, in full power systems, safety requires three actuators, two of which are redundant, to provide adequate safety. For example, a failure that demands a hard over-control surface, like a valve jam, is passive in nature and can go undetected for long periods of time in the three-actuator system. A hard over-command on the first actuator requires a similar hard over-command in the opposite direction to neutralize the force of the first actuator. Since these two forces are equal and opposite, if there were only two actuators, the surface would return to a neutral or faired position only if there was a restoring force sufficient to increase the pressure in the jammed actuator above its relief valve setting. To remedy this problem a third actuator is employed.

New aircraft designs are placing great emphasis on fuel efficiency because of recent large fuel cost increases. One of the major factors in the efficiency of an aircraft is its weight. Weight reduction has caused the elimination of split or segmented elevators and rudder surfaces by employing single control surfaces to reduce the number of actuators required. Because of the hard-over actuator failure, discussed above, each of the three valve/actuator packages is totally separate to provide adequate redundancy so that the correctly controlled actuator can fight and overcome any incorrectly controlled unit. Where multiple actuators are employed on a common surface it is extremely difficult to prevent and inspect for a force fight between drives. Force fights introduce high fatigue cycling on structural members thereby increasing aircraft weight as well as creating a dead band around valve null, causing poor surface positionability.

Flight control system architecture is further complicated by the airworthiness requirements dictated by the Federal Aviation Regulations. Among these requirements is a requirement that the aircraft withstand a noncontained engine failure, which means that the flying debris as a result of the failure wipes out everything in its path, and still maintain flight control authority. This analysis is affected by the number of engines and the number of power systems as well as the distribution route for the power systems. An increase in the number of engines and in the number of power systems eases the effort to meet this requirement.

Further, a one-element control surface driven by three separate valve/actuator packages experiences force fights as discussed above. Because these force fights impose high loads on the surface, the three actuators need be close together to avoid racking or twisting the surface because of the high loads imposed where the actuators are separated over the span of the surface. Because of this location requirement and the high loads on the supporting structure, the actuator system must be constructed more ruggedly and hence heavier. Due to these complicated variables, aircraft with more than two engines may not necessarily need to achieve all the objectives or benefits of this invention.

It is an object of this invention to produce flight control systems which meet the necessary airworthiness requirements at minimum weight and cost. It is a further object of this invention to minimize the force fight between multiple actuators actuating a flight control surface and to devise a system which allows detection of any force fight readily and easily on the ground. It is a still further object of the invention to alleviate the need for the flutter control balance weights.

SUMMARY OF THE INVENTION

In summary, a flight control surface coupling system of this invention accomplishes the above objects and overcomes the disadvantages of the prior devices by providing a limited travel compliance mechanism. The mechanism consist of a torsion bar, located at the hinge line which connects two segments of the control surface and relative displacement of the two segments is limited by a drive coupling that permits the two surfaces to move freely within its stops. Stop spacing is large enough to allow easy visual determination of any out-of-rig condition between the two surfaces while still allowing one surface to drive the other surface through the stops. In the preferred embodiment, each surface segment drive system employs a dual tandem valve, which essentially eliminates any force fight between the two actuators driving one segment. The torsion bar is selected with a spring rate sufficient to supress surface flutter yet soft enough to function as a load compliance element between sets of drive actuators which drive the two surface segments.

BRIEF DESCRIPTION OF THE DRAWINGS

With reference to the drawings, wherein like reference numerals designate like portions of the invention.

DESCRIPTION OF THE PREFERRED EMBODIMENT

Figure 1:
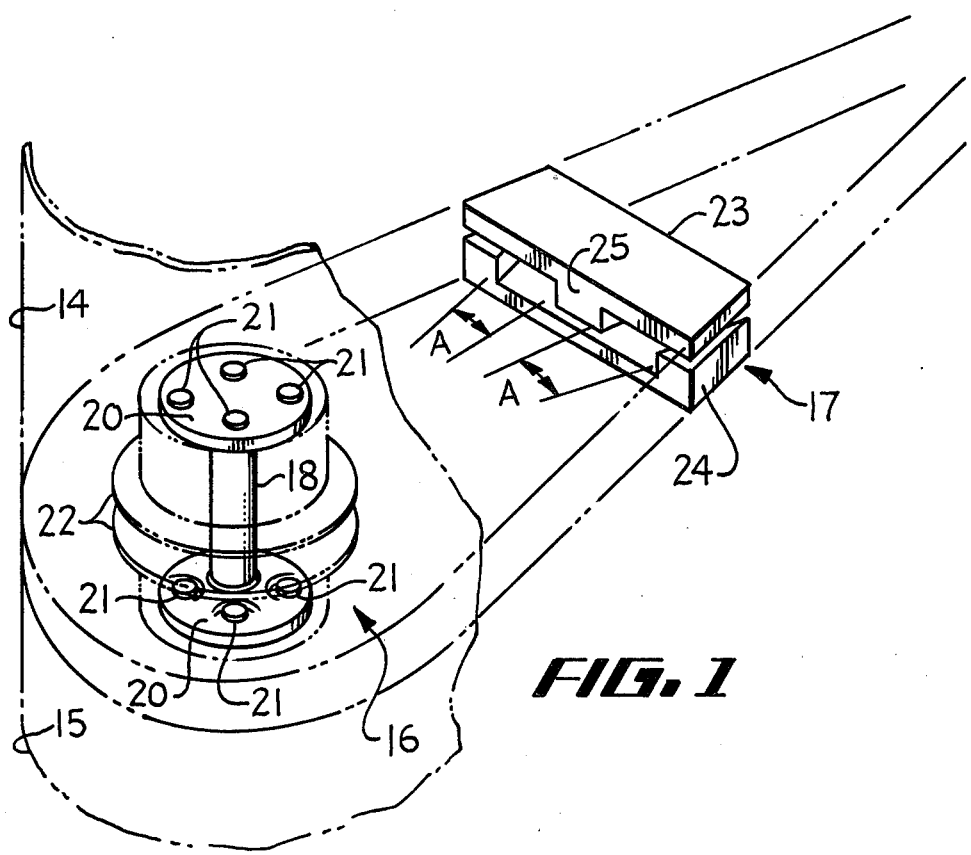
FIG. 1 is a perspective view of the flight control surface coupling system connecting two segments of an airfoil.
Figure 2:
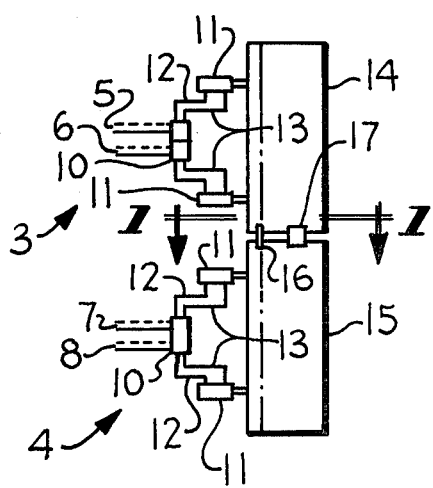
FIG. 2 is a schematic representation of the flight control actuation system.

Viewing the single-line system schematic of FIG. 2, system pressure and return lines are shown at 5, 6, 7, and 8. The dotted lines represent the return lines. In the preferred embodiment, each system represents an independent power source so that each actuator is driven by an independent power source. Powering systems (not shown) are connected to a pair of dual tandem valves 10. The tandem control valve 10 is a factory machined unit which maintains close pressure limits system-to-system so the force fight is essentially eliminated between the actuators controlled from one tandem valve. Each dual tandem valve is shown connected to the actuators 11 by a pair of hydraulic lines 12 and 13 which function alternately as pressure and return lines, depending on the direction of motion of the actuator 11. For the purpose of this description, the airfoil will be treated as a rudder having an upper segment 14 and a lower segment 15. The upper and lower segments of the rudder are shown connected by a two-element drive coupling between the control surface segments 14 and 15. The first element is a compliance coupling torsion element 16 and the second element is a limit stop element 17.

The torsion element 16 consists of a torsion bar 18 which terminates in a pair of flanges 20 which are in turn secured to the airfoil segments structure by the fasteners 21. The attached structure 22 is shown in reference lines and has a hat section shape to accommodate the necessary length of the torsion bar 18. The torsion bar 18 must have adequate spring rate to supress surface flutter while it must be weak enough to offer a low load compliance restraint between the sets of drive actuators 11 which drive the upper and lower segments 14 and 15. Should an out-of-rig condition exist between the upper and lower segments 14 and 15 it is readily indicated by the surface segment displacement shown by the angle A which must occur at relatively low actuator power outputs.

The second element of the surface coupling system is the limit stop element 17. This element consists of a male stop 23 attached to the upper rudder segment 14 and a female stop 24 which is attached to the lower rudder segment 15. The two stops 23 and 24 are arranged in the neutral position so the protrusion 25 splits the space between the stops in the female stop 24. This arrangement allows displacement of the two surface segments relative to each other as indicated by the arc segments A.

It should now be reasonably clear, that essentially no force fight can exist between the two actuators 11 of either the upper surface drive system 3 or the lower surface drive system 4 since the dual tandem valve 10 essentially eliminates this possibility. However, a force fight can exist between the upper surface drive system 3 and the lower surface drive system 4. However, the loads are minimized by the proper selection of the torsion element 16 and structural fatigue loads are greatly reduced without sacrificing surface positionability. Further, any relative movement between the segments 14 and 15 is clearly observable on the ground so that the force flight can be readily detected and corrected. Additionally, either surface element 14 or 15 can drive the other surface element through the compliance coupling element 17 even though the two segments will be offset by the angle A. Any single actuator 11 is capable of driving both segments through the torsion element 16 and the drive coupling element 17.

The flight control surface coupling system of this invention provides a limited travel compliance mechanism which is stiff enough to supress surface flutter, soft enough to provide visual indication of an actuator out-of-rig condition between the two surface segments, and provide the airworthiness requirements of the regulations all at a reduced overall weight by reducing the structural fatigue loads by greatly alleviating the force fight between the actuators as indicated as objectives of the invention.

What is claimed is:

1. A compliant coupling system for connecting segments of an aircraft control surface comprising:
   at least two airfoil segments arranged side by side and hinged for rotation about a generally common hinge line;
   at least two actuators driving each of said airfoil segments and at least one of said actuators is redundant;
   a spring biasing means connecting said at least two airfoil segments so that said at least two airfoil segments may rotate relative to each other by stressing said spring; and
   means to limit said relative rotation between said at least two airfoil segments and provide a coupling between said at least two airfoil segments so that one airfoil segment may drive the other airfoil segment.

2. The compliant coupling system of claim 1 wherein said spring biasing means connecting said at least two airfoil segments is a torsion bar spring located on said generally common hinge line.

3. The compliant coupling system of claim 1 or 2 wherein said means to limit said relative rotation between said at least two airfoil segments and provide a coupling between said at least two airfoil segments is a pair of female stops spaced from each other and attached to one of said at least two airfoil segments and a male stop located between said female stops so that relative rotation between said airfoil segments causes said male stop to engage one of said female stops and said male stop is attached to the second of said at least two airfoil segments whereby limited relative rotation of the segments is followed by engagement of the stops and one segment drives the other segment.

4. The compliant coupling system of claim 1 wherein said at least two airfoil segments are attached to a fixed main airfoil.

* * * * *